(12) United States Patent  (10) Patent No.: US 9,149,884 B2
Perisetty et al.  (45) Date of Patent: Oct. 6, 2015

(54) UNIVERSAL HEAD-MIX SWIRL INJECTOR FOR GAS TORCH

(71) Applicant: The ESAB Group, Inc., Florence, SC (US)

(72) Inventors: Shiva Perisetty, Florence, SC (US); Gregory Stauffer, Florence, SC (US)

(73) Assignee: The ESAB Group, Inc., Florence, SC (US)

( * ) Notice: Subject to any disclaimer, the term of this patent is extended or adjusted under 35 U.S.C. 154(b) by 0 days.

(21) Appl. No.: 13/893,876

(22) Filed: May 14, 2013

(65) Prior Publication Data

US 2013/0300039 A1  Nov. 14, 2013

Related U.S. Application Data

(60) Provisional application No. 61/646,450, filed on May 14, 2012.

(51) Int. Cl.
| | | |
|---|---|---|
| *B23K 7/00* | (2006.01) | |
| *F23D 14/02* | (2006.01) | |
| *F23D 14/38* | (2006.01) | |
| *F23D 14/52* | (2006.01) | |
| *F23D 14/82* | (2006.01) | |

(52) U.S. Cl.
CPC . *B23K 7/00* (2013.01); *F23D 14/02* (2013.01); *F23D 14/38* (2013.01); *F23D 14/52* (2013.01); *F23D 14/82* (2013.01)

(58) Field of Classification Search
CPC .................................. B23K 7/00; F23D 14/02

USPC ............................................ 266/48; 431/354
See application file for complete search history.

(56) References Cited

U.S. PATENT DOCUMENTS

| | | | |
|---|---|---|---|
| 4,022,441 A | 5/1977 | Turney | |
| 4,248,384 A | 2/1981 | Zwicker | |
| 4,409,002 A | 10/1983 | Zwicker | |
| 4,477,262 A | 10/1984 | Pryor | |
| 4,572,483 A | 2/1986 | Leu | |
| 4,664,621 A | 5/1987 | Sugisaku et al. | |
| 5,407,348 A | 4/1995 | Mims et al. | |
| 6,824,735 B2 | 11/2004 | Pryor | |
| 2013/0300039 A1* | 11/2013 | Perisetty et al. | ................ 266/48 |

OTHER PUBLICATIONS

International Search Report and Written Opinion mailed Sep. 19, 2013 for PCT/US2013/040934 filed May 14, 2013.
Supplementary European Search Report dated Apr. 22, 2015, for corresponding European Patent Application No. 13791130.1 filed May 14, 2013.

* cited by examiner

*Primary Examiner* — Scott Kastler
(74) *Attorney, Agent, or Firm* — Kacvinsky Daisak Bluni PLLC

(57) ABSTRACT

A head-mix swirl injector for gas torches. The swirl injector may include an injector body adapted to be disposed in a head of the torch. The injector body may define a swirl baffle, an injector orifice in fluid communication with the swirl baffle, and a mixing chamber in fluid communication with the injector orifice. The swirl injector may further include at least one gas port extending from the mixing chamber to an exterior of the injector body. The mixing chamber may have a larger diameter than the injector orifice.

19 Claims, 7 Drawing Sheets

UNIVERSAL HEAD-MIX SWIRL INJECTOR FOR GAS TORCH

CROSS-REFERENCE TO RELATED APPLICATIONS

This is a non-provisional of pending U.S. provisional patent application Ser. No. 61/646,450, filed May 14, 2012, the entirety of which application is incorporated herein by reference.

FIELD OF THE DISCLOSURE

The disclosure relates generally to the field of gas burning torches and more particularly to an improved fuel gas and oxygen mixer for a cutting torch head.

BACKGROUND OF THE DISCLOSURE

Fuel gas-oxygen cutting torches are well known and generally comprise a torch head having outlet passages communicating with a torch tip through which a combustible gaseous mixture flows and is ignited and directed toward a workpiece. The torch typically includes fuel gas and oxygen supply lines connected to corresponding sources of fuel gas and oxygen, and valves are provided for controlling the flow of fuel gas and oxygen to the torch head. Such torches have a preheat mode of operation in which the fuel gas and oxygen are combined in a mixer to provide a combustible mixture which then flows to the torch head outlet and torch tip where the mixture is ignited to form a preheat flame which is used to heat a workpiece to a temperature which will support combustion. Such torches also have a cutting mode of operation in which, following a preheat operation, cutting oxygen is supplied to the torch tip separate from the preheat combustible mixture to flow from the tip and cut the heated work piece.

It is the function of the fuel gas-oxygen mixer to mix the fuel gas and oxygen components—which are separately supplied thereto—and to deliver the mixture to the torch tip in order to achieve uniform combustion efficiency throughout the flame that results from igniting the combustible mixture at the tip.

Another performance requirement with regard to fuel gas-oxygen mixers is to provide resistance to flashback that can result from a backfire occurring, for example, in response to contacting the torch tip with the work piece. Such backfires can cause an explosion inside the torch between the point of mixing of the fuel gas and oxygen and the point of combustion of the mixture at the torch tip. Where backfiring results in sustained combustion inside the torch, this sustained combustion is defined as flashback. Flashback can quickly destroy a torch and injure a user. Accordingly, the fuel gas-oxygen mixer must be capable of minimizing or eliminating backfires so as to minimize the chance for, or impact of, flashbacks. Mixer designs heretofore available have been structurally complex, bulky, and undesirably expensive to manufacture. They are also difficult and/or time consuming to manufacture and assemble.

Moreover, many mixer designs suffer from the deficiency that they are limited to use with a single type of fuel (e.g., acetylene, natural gas, propane, propylene qtane). It would be desirable, therefore, to provide a simplified mixing head design that is easy to manufacture, that provides a desirable resistance to backfires/flashbacks and that is operable with a variety of fuels.

SUMMARY

A universal head-mix swirl injector is disclosed. The injector may be mounted into the head of a gas torch. A swirl baffle is provided upstream of an injector orifice, and gas ports are positioned so as to draw vacuum as gas expands into a mixing chamber positioned downstream thereof A swirl injector is disclosed for continuously mixing two gases. A first gas is delivered at a relatively high flow rate, and is passed through a swirl baffle and accelerated through an injector orifice. This movement introduces intense axial and tangential velocities in the first gas. Downstream of the injector orifice, the first gas encounters a sudden expansion adjacent to injection ports for a second gas. The injection ports for the second gas are located so as to generate a vacuum that varies in intensity with the flow rate of the first gas. The vacuum draws the second gas through the injection ports where it mixes with the first gas in a mixing chamber. The mixed gas is then provided to the torch tip where it may be ignited.

In accordance with the present disclosure, a head-mix swirl injector for gas torches is provided. An embodiment of the swirl injector may include an injector body adapted to be disposed in a head of the torch. The injector body may define a swirl baffle, an injector orifice in fluid communication with the swirl baffle, and a mixing chamber in fluid communication with the injector orifice. The swirl injector may further include at least one gas port extending from the mixing chamber to an exterior of the injector body. The mixing chamber may have a larger diameter than the injector orifice.

A method for mixing gases within a head of a gas torch in accordance with the present disclosure may thus include the steps of forcing a first gas through a swirl baffle, forcing the first gas from the swirl baffle into an injector orifice, and forcing the first gas from the injector orifice into a mixing chamber having a larger diameter than the injector orifice. Such routing of the first gas creates intense pressure gradients in the mixing chamber that pull a second gas into the mixing chamber through at least one gas port that is in fluid communication with a fuel tube. The first and second gases are mixed together before being ignited at a tip of the torch.

BRIEF DESCRIPTION OF THE DRAWINGS

By way of example, specific embodiments of the disclosed device will now be described, with reference to the accompanying drawings, in which.

DETAILED DESCRIPTION

Figure 1:
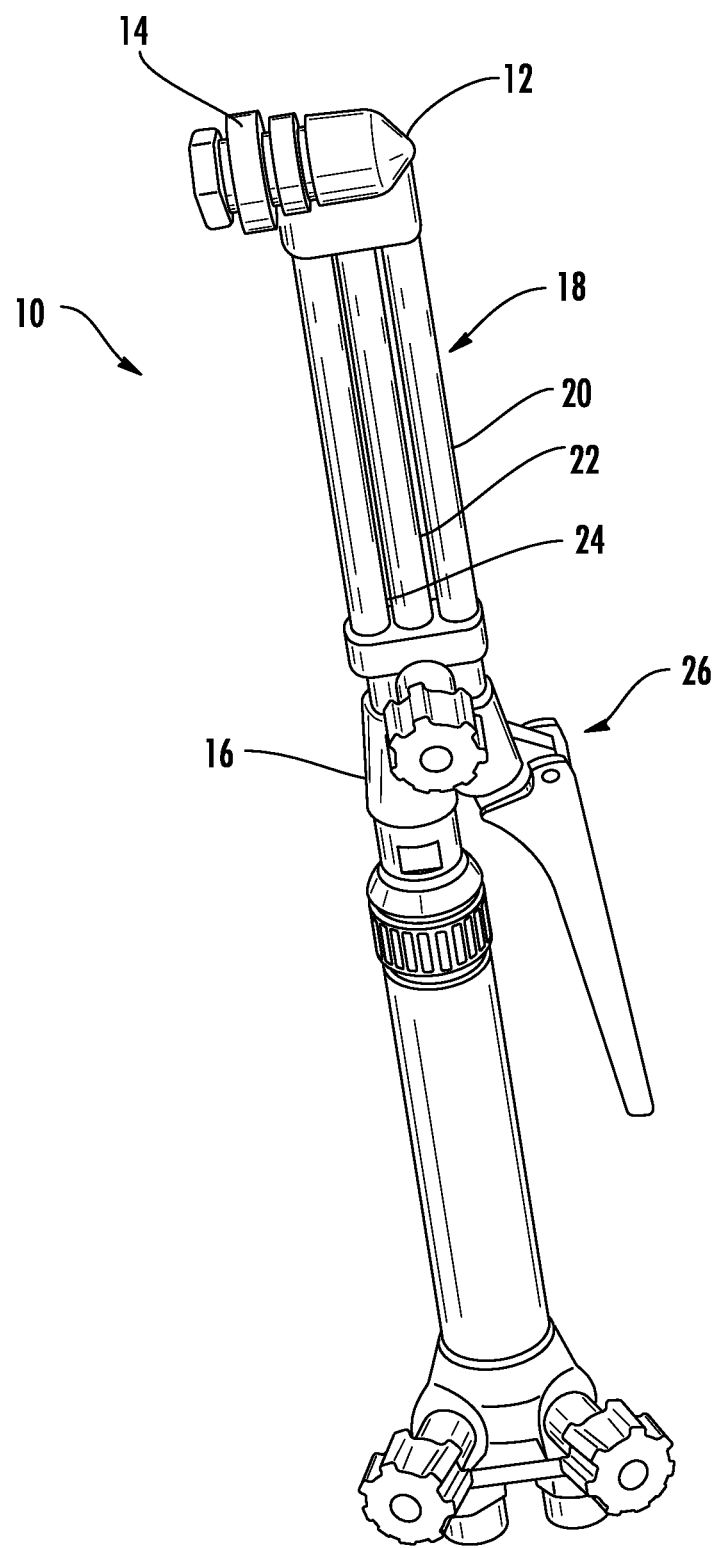
FIG. 1 is a perspective view of an exemplary gas torch.
Figure 2:
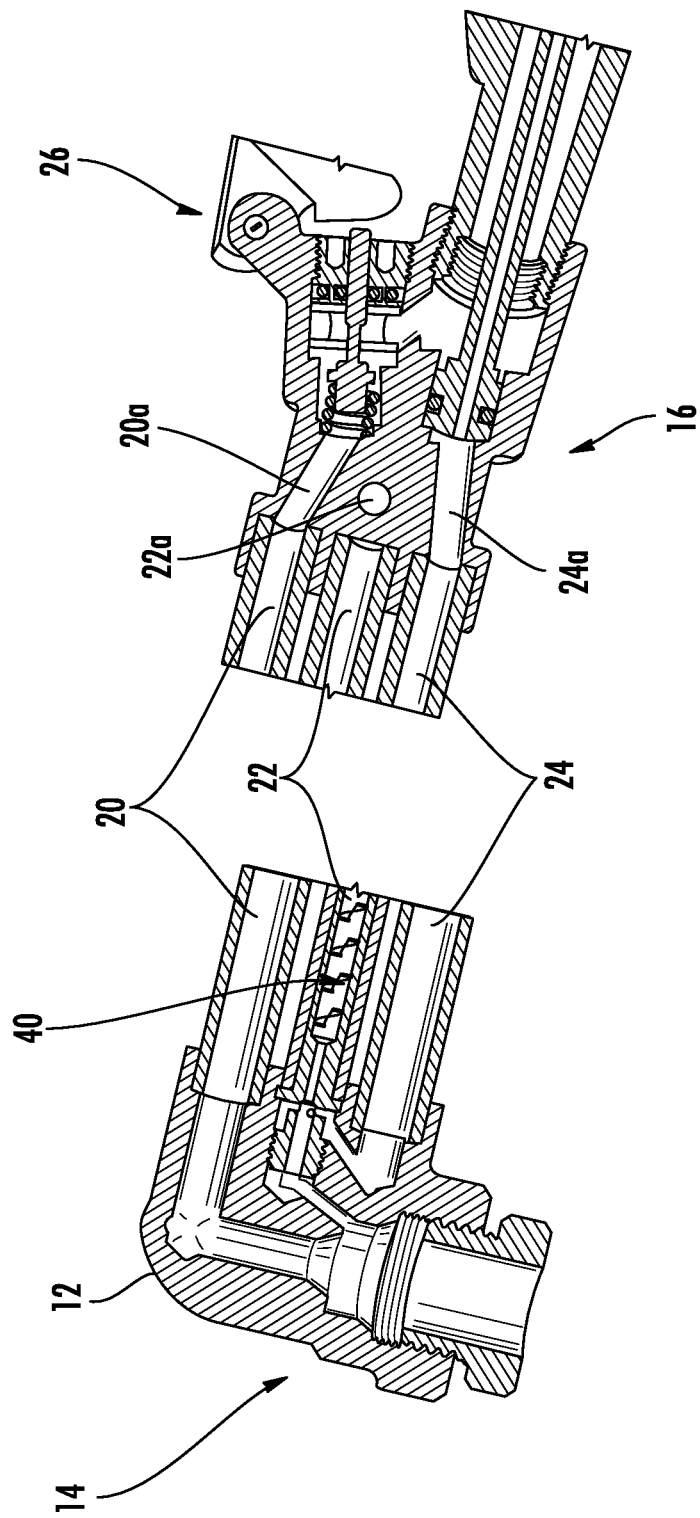
FIG. 2 is a partial cross-section view of the exemplary gas torch of FIG. 1 incorporating the disclosed head mix swirl injector.

Referring to FIGS. 1 and 2, there is illustrated a cutting attachment type torch 10 having a torch head 12 with a tip end 14, a body 16, and respective gas supply tubes 18. As illustrated there are three tubes 18 that are coupled to the head 12. These tubes 18 may include an oxygen tube 20, a mixing oxygen tube 22, and a fuel tube 24. Each of the tubes 18 may also be coupled to the torch body 16 so as to connect with respective cutting oxygen, mixing oxygen, and fuel passageways (20a, 22a, 24a) that extend through the body 16. The torch 10 may also include a cutting oxygen valve and lever assembly 26 interposed in the cutting oxygen passageway for controlling gas flow to the torch 10. Disposed within a portion of the torch head 12 and the mixing oxygen tube 22 is a swirl injector 40 coupled to the mixing oxygen tube 22 and the fuel tube 24 for mixing oxygen with fuel in a manner that will be described in greater detail later.

Figure 3:
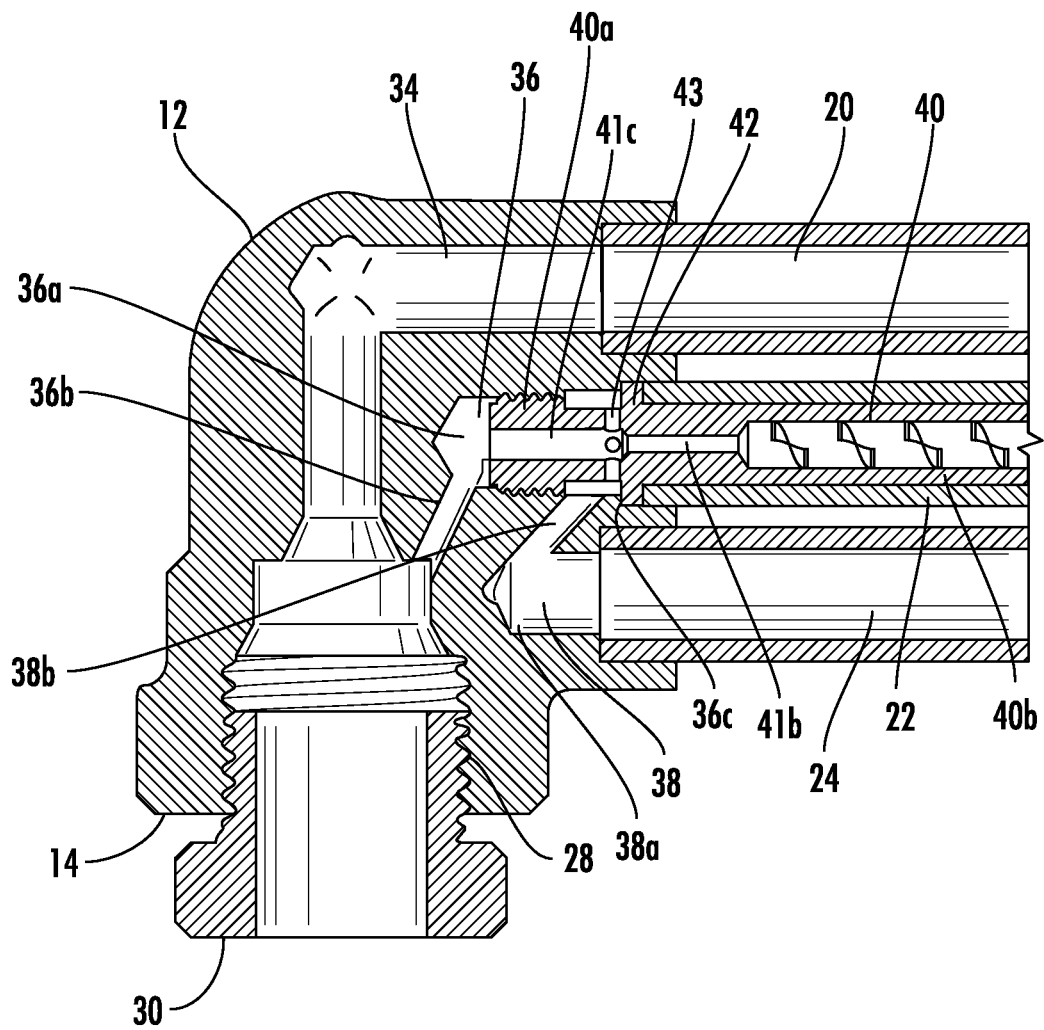
FIG. 3 is a cross-section view of a head portion of the exemplary gas torch of FIG. 1 showing the disclosed head mix swirl injector.
Figure 4A:
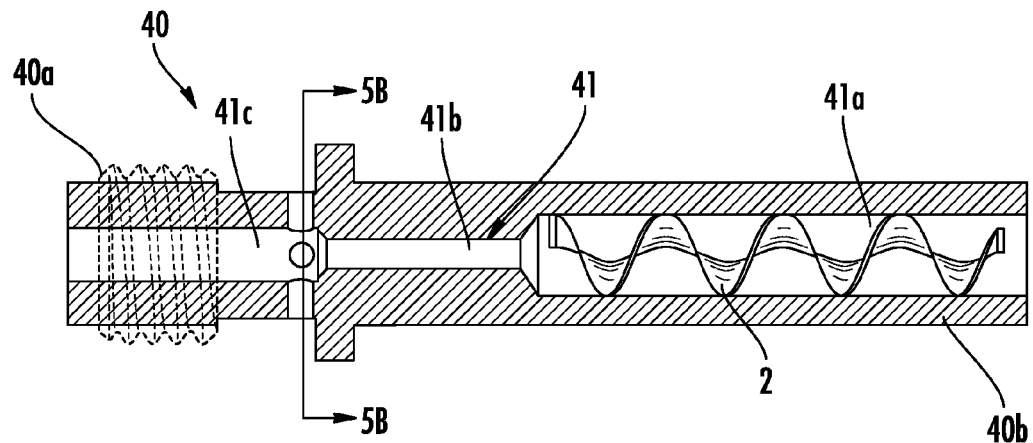
FIGS. 4A, 4B and 4C are transparent, side and cross-section views of an exemplary swirl injector in accordance with the present disclosure.
Figure 4B:
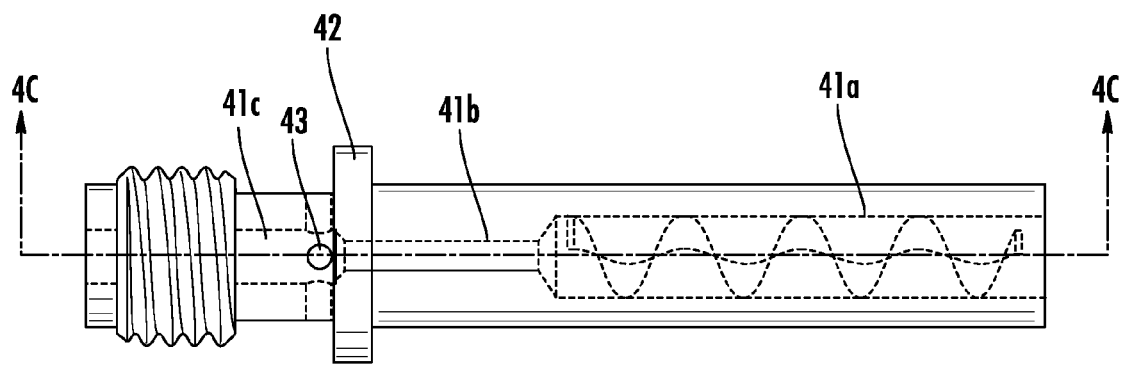
Figure 4C:
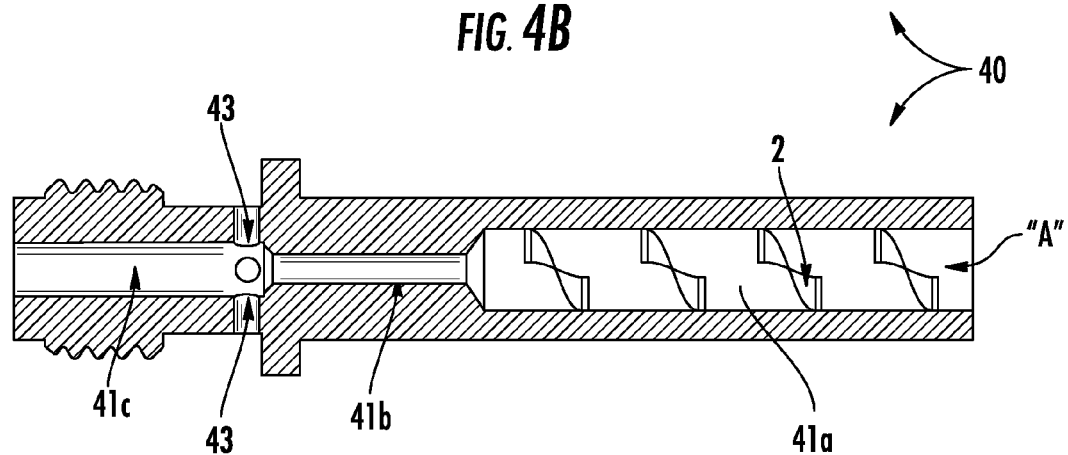

Referring to FIG. 3, the torch head 12 is shown as a so-called ninety degree torch head, such as may be employed to orient the torch tip at substantially ninety degrees relative to the remainder of the torch to facilitate user observation of work being performed. This is not critical, however, and the head 12 may be of any of a variety of other orientations, as desired. The torch head 12 may has a threaded section 28 adjacent its tip end 14 for attaching a tip 30 thereto. The torch head 12 contains a cutting oxygen passageway 34 extending from a terminus of the cutting oxygen tube 20 to the tip end 14 of the torch head 12. The torch head 12 further contains a mixing oxygen passageway 36 having a large diameter portion 36a disposed adjacent the terminus of the mixing oxygen tube 22 and small diameter portion 36b extending from a downstream end of the large diameter portion to the tip end 14 of the head 12. The torch head 12 further contains a fuel passageway 38 having a large diameter portion 38a extending axially from the terminus of the fuel tube 24 and a small diameter portion 38b extending from the downstream end of the large diameter portion 38a to a point that intersects the large diameter portion 36a of the mixing oxygen passageway 36.

FIGS. 2 and 3 illustrate the position of a swirl injector 40 having a first end 40a disposed in the torch head 12 and a second end 40b disposed in the mixing oxygen tube 22. The swirl injector 40 may be an elongated, generally cylindrical element having its first end 40a mounted, such as by threaded engagement, within the mixing oxygen passageway 36 of the torch head 12 in a substantially coaxial relationship therewith. The second end 40b may extend longitudinally into the mixing oxygen tube 22 in a close-clearance and substantially coaxial relationship therewith. An annular flange 42 may extend from an exterior of the swirl injector 40 for abutting an upstream shoulder 36c of the mixing oxygen passageway 36, thereby securing the relative axial position of the swirl injector 40 with respect to the torch head 12.

Referring now to FIGS. 4A-6C the swirl injector 40 will be described in greater detail. As noted, the swirl injector 40 may have first and second ends 40a, 40b for engaging cooperating portions of the torch head 12 and mixing oxygen tube 22. The first end 40a may include threads to engage cooperating threads in the torch head 12. The second end may be generally cylindrical and may be sized to be received in close conformity with the inside diameter of the mixing oxygen tube 22.

A central passageway 41 may run between the first and second ends 40a, 40b of the swirl injector 40. The central passageway 41 may include a first portion 41a disposed adjacent to the second end 40b of the swirl injector 40. This first portion 41a may be sized to contain a swirl baffle 2 therein. As will be described in greater detail later, the swirl baffle 2 may create a spiral-shaped channel within the first portion 41 so as to cause gas passed through the first portion 41a in the direction of arrow "A" (FIG. 4C) to swirl as it passes through the central passageway 41.

The central passageway 41 may also include a second portion 41b adjacent to the first portion 41a. The second portion 41b may comprise an injector orifice having a diameter that is smaller than the diameter of the first portion 41a.

The central passageway may have a third portion 41c adjacent to the second portion 41b. The third portion 41c may comprise a mixing chamber having a diameter smaller than the diameter of the first portion 41a, but larger than the diameter of the second portion 41b. A plurality of gas inlet ports 43 may be disposed in a wall of the swirl injector 40. The gas inlet ports 43 may be positioned so that gas may pass through the ports and into the mixing chamber (i.e., the third portion 41c of the central passageway). In some embodiments, the plurality of gas inlet ports 43 are circumferentially-spaced about the diameter of the swirl injector 40. As can be seen in FIG. 3, the gas inlet ports are 43 positioned so that when the swirl injector 40 is installed in the torch head 12, the ports are in fluid communication with the small diameter portion 38a of the fuel passageway 38. In this way, fuel from the fuel passageway 38 may be introduced through the ports 43 into the central passageway 41 so that it can mix with oxygen from the mixing oxygen tube 22.

Figure 5A:
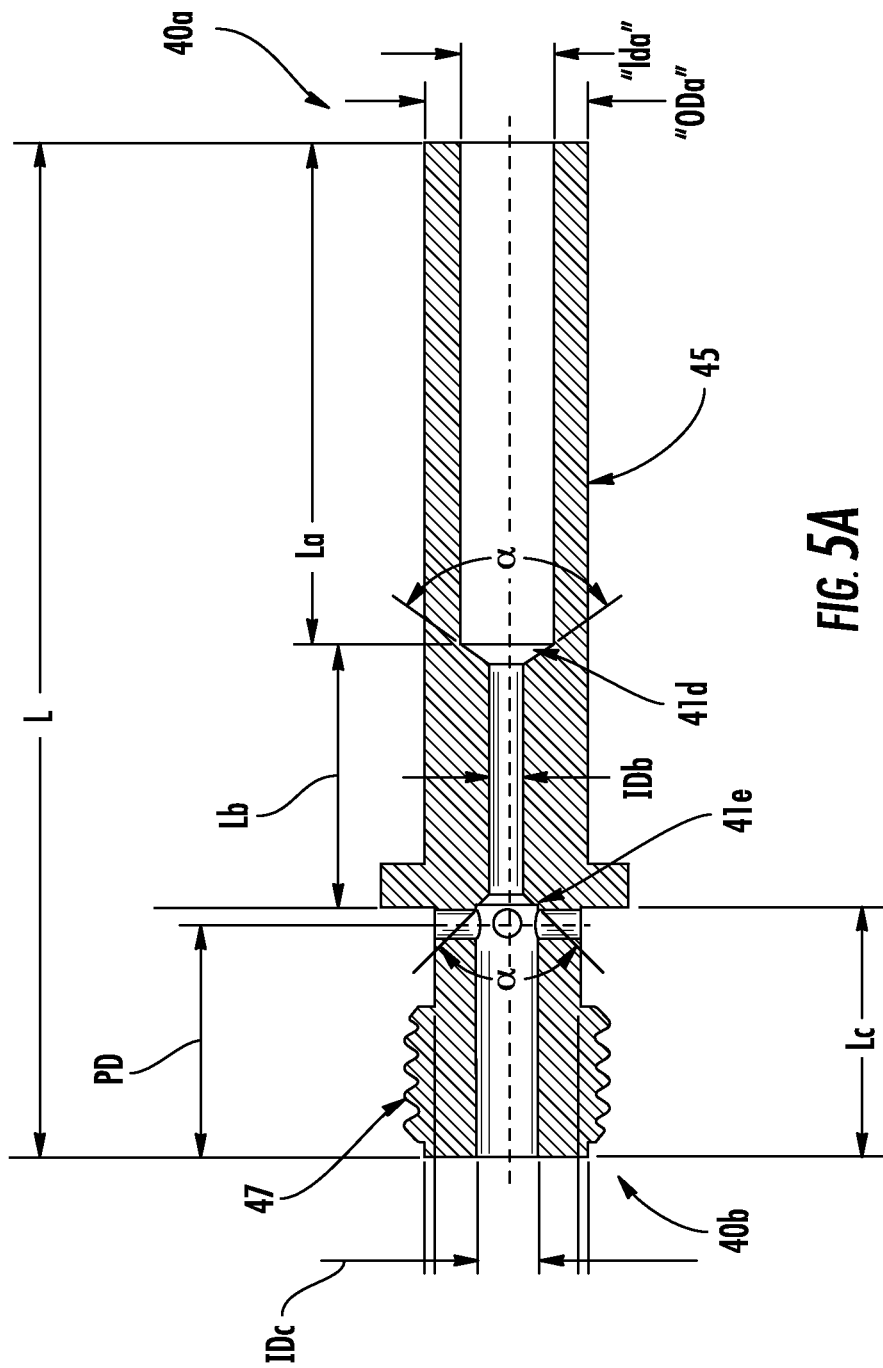
FIG. 5A is a cross-section view of an injector body for use in the swirl injector of FIGS. 4A-4C.
Figure 5B:
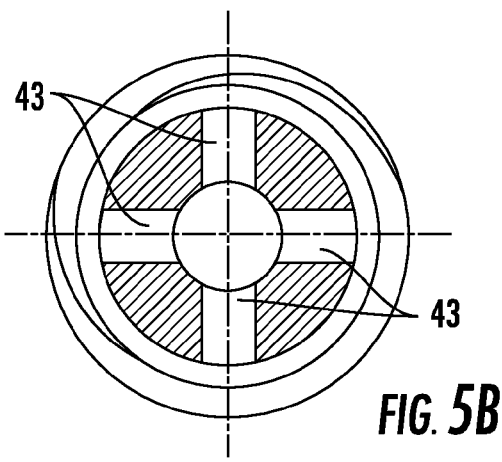
FIG. 5B is a cross-section of the injector body taken along line 5B-5B of FIG. 4A.

FIGS. 5A and 5B show a body portion 45 of the swirl injector 40 (i.e., without the baffle 2 in place). The body portion 45 may have an overall length "L," with first, second and third lengths "La," "Lb," "Lc" corresponding to the first, second and third portions 41a, 41b, 41c of the central passageway 41, respectively. In addition, the first, second and third portions 41a, 41b, 41c of the central passageway 41 may have different inside diameters. The first inside diameter "IDa" may correspond to the first portion 41a of the central passageway 41, and may be sized to receive the swirl baffle 2 therein. The second inside diameter "IDb" may correspond to the second portion 41b of the central passageway 41 and may be smaller than the first inside diameter "IDa." The third inside diameter "IDc" may correspond to the third portion 41c of the central passageway 41 and may be larger than the second inside diameter "IDb" but smaller than the first inside diameter "IDa." The gas inlet ports 43 may be positioned a distance "PD" from the second end of the swirl injector body.

In one non-limiting exemplary embodiment, the overall length "L" of the swirl injector body 45 may be about 1.635-inches, the first length "La" may be about 0.825-inches, the second length "Lb" may be about 0.418-inches, and the third length "Lc" may be about 0.392-inches. In addition, the first inside diameter "IDa" may be about 0.147-inches, the second inside diameter "IDb" may be about 0.046-inches, and the third inside diameter "IDc" may be about 0.089-inches. The gas inlet ports 43 may be positioned so that their centers are about 0.365-inches (dimension "PD") from the second end 40b of the swirl injector. The gas inlet ports 43 may also each have an inside diameter of about 0.041-inches.

First and second chamfers 41d, 41e may be provided between the first and second 41a, 41b, and the second 41b and third 41c portions of the central passageway 41. The first and second chamfers may have an angle "a." In one non-limiting embodiment, a is about 118 degrees.

The first end 40a of the swirl injector body 45 may have an outside diameter "ODa" sized to be received within the mixing oxygen tube 22, while the second end 40b may have a set of male threads 47 sized and configured to cooperate with corresponding female threads of the torch head 12.

In one exemplary non-limiting embodiment, the gas inlet ports 43 are positioned within two diameters (i.e., gas port diameters) distance from the transition between the second portion 41*b* and the third portion 41*c* of the central passageway 41. This places the gas inlet ports 43 at a location in the third portion 41*c* (i.e., the mixing chamber) where the swirling flow of gas from the mixing oxygen tube 22 expands to provide a desired vacuum level for pulling fuel through the gas inlet ports 43 at an optimal rate.

Figure 6A:
FIGS. 6A, 6B and 6C are perspective, side and end views, respectively, of an exemplary swirl baffle for use in the swirl injector of FIGS. 4A-C.
Figure 6B:
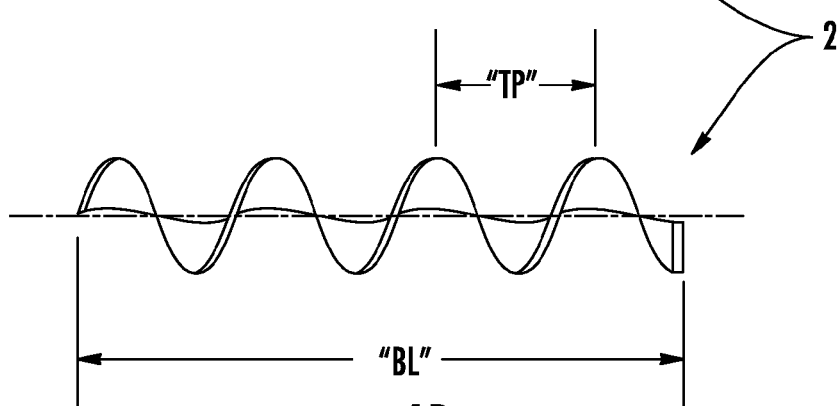
Figure 6C:
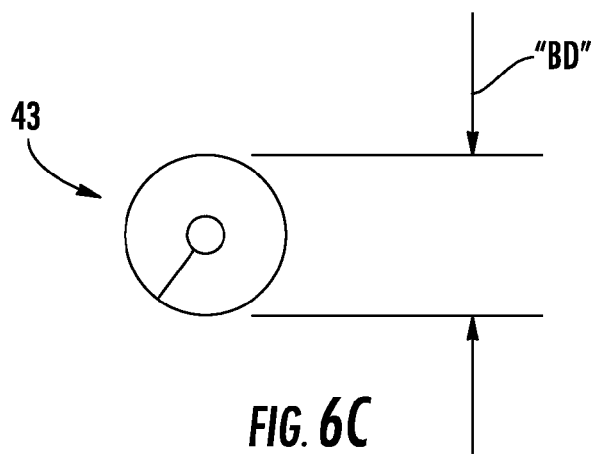

Referring now to FIGS. 6A-6C, the swirl baffle 2 is shown. In the illustrated embodiment, the swirl baffle 2 comprises a flat element that is twisted so that the baffle resembles a corkscrew that may then be inserted into the first portion 41*a* of the central passageway 41 of the swirl injector body 45. The swirl baffle 2 may have an outside diameter "BD" of about 0.146-inches, a twist period "TP" of about 0.19-inches, and an overall length "BL" of about 0.77-inches. Upon assembly, the swirl baffle 2 may be inserted into the first portion 41*a* of the central passageway 41 and crimped to the body 45. The swirl injector body 45 and swirl baffle 2 may be made from copper, which can provide desired heat transfer characteristics.

Figure 7:
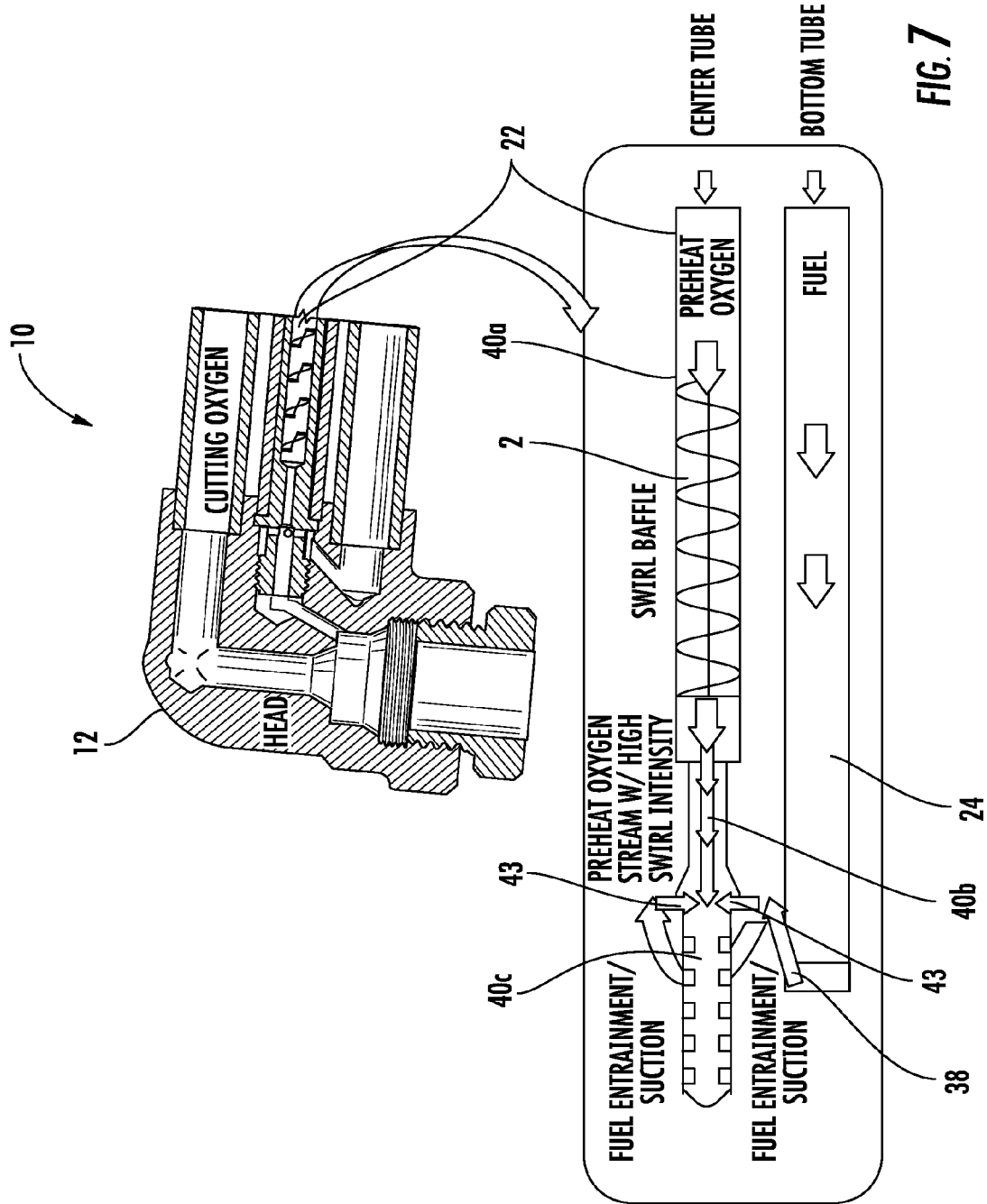
FIG. 7 illustrates the movement of oxygen and fuel through the head portion of the gas torch of FIG. 1.

Referring to FIG. 7, exemplary operation of the torch 10, including swirl injector 40, will be described. As shown, preheat oxygen is directed from an oxygen source through the mixing oxygen tube 22. The preheat oxygen enters the first end 40*a* of the swirl injector 40 where the swirl baffle 2 causes the oxygen to be tangentially swirled in the manner of a vortex. The preheat oxygen is then directed into the second portion 41*b* (the injector orifice) of the central passageway 41. The reduced diameter of the second portion 41*b* relative to the first portion 41*a* causes the oxygen to accelerate through the second portion.

The preheat oxygen then enters the third portion 41*c* (the mixing chamber) of the central passageway 41. As the preheat oxygen expands into the increased diameter third portion 41*c*, it creates a reduced pressure region which causes fuel gas in the fuel tube 24 to be drawn through the fuel passageway 38 and the gas inlet ports 43 into the third portion 41*c* of the central passageway. As will be appreciated, the swirling, acceleration and expansion of the preheat oxygen causes thorough mixing of the fuel and oxygen.

The inventors have found that the magnitude of the vacuum force, and therefore the entrainment of the fuel gas in the oxygen, varies with the flow rate of the preheat oxygen. The fuel gas and the preheat oxygen will therefore always be mixed in correct proportion to one another regardless of the flow rate of the oxygen. The disclosed design can, therefore, provide effective mixing of a variety of fuel gases, including acetylene, natural gas, propane and propylene. In addition, the inventors have found that as a result of the enhanced fuel/oxygen mixing provided by the disclosed design, reduced gas consumption is experienced during cutting operations.

In addition, because the mixing of the oxygen and the fuel takes place in the head 12 of the torch 10, the likelihood of injury to a welder in the event of a flashback. In the disclosed embodiment, less than ¼-inch of gas is in the torch head, reducing the potential impact of, and possibility of, explosion and injury to a user.

Based on the foregoing information, it will be readily understood by those persons skilled in the art that the disclosed device is susceptible of broad utility and application. Many embodiments and adaptations of the disclosed device other than those specifically described herein, as well as many variations, modifications, and equivalent arrangements, will be apparent from or reasonably suggested by the disclosed device and the foregoing descriptions thereof, without departing from the substance or scope of the present invention. Accordingly, while the disclosed device has been described herein in detail in relation to one or more embodiments, such are to be understood that this disclosure is only illustrative and exemplary of the disclosed device and is made merely for the purpose of providing a full and enabling disclosure of the disclosed device. The foregoing disclosure is not intended to be construed to limit the present invention or otherwise exclude any such other embodiments, adaptations, variations, modifications or equivalent arrangements; the disclosed device being limited only by the claims appended hereto and the equivalents thereof Although specific terms are employed herein, they are used in a generic and descriptive sense only and not for the purpose of limitation.

The invention claimed is:

1. A mixing injector for a gas torch, the mixing injector comprising:
    an injector body adapted to be disposed in a head of the torch, the injector body comprising:
        a central passageway running between first and second ends of the injector body, a first portion of said central passageway enclosing a swirl baffle;
        a second portion of said central passageway including an injector orifice having a diameter that is smaller than a diameter of the first portion of said central passageway;
        a third portion of said central passageway comprising a mixing chamber, the mixing chamber having a diameter larger than a diameter of the injector orifice and smaller than the diameter of the first portion of said central passageway, the swirl baffle, the injector orifice, and the mixing chamber sharing a common axis; and
        a gas inlet port extending from a wall of the mixing chamber to an exterior of the injector body, the gas port for receiving fuel gas from a fuel gas supply and for directing said fuel gas to said mixing chamber.

2. The mixing injector of claim 1, wherein the gas inlet port comprises a plurality of gas inlet ports.

3. The mixing injector of claim 1, wherein the plurality of gas inlet ports are evenly spaced about a circumference of the injector body.

4. The mixing injector of claim 1, wherein the gas inlet port has a diameter, and the gas inlet port is spaced a first distance from the transition between the second and third portions of the central passageway, wherein the first distance is equal to or less than two times the diameter.

5. The mixing injector of claim 1, wherein the swirl baffle comprises a flat element twisted to resemble a corkscrew.

6. The mixing injector of claim 1, the injector body further comprising first and second ends, the first end including threads for engaging cooperating threads in a gas torch head, the second end being generally cylindrical and sized to be received in close conformity with an inside diameter of a mixing oxygen tube.

7. The mixing injector of claim 1, wherein a transition between the first and second portions of the central passageway comprises a first chamfer having a chamfer angle.

8. The mixing injector of claim 7, wherein a transition between the second and third portions of the central passageway comprises a second chamfer having said chamfer angle.

9. A gas torch, comprising
    a torch head, a cutting oxygen tube, a mixing oxygen tube, and a fuel gas tube; and
    a mixing injector comprising an injector body coupled at a first end to the torch head, and at a second end to the mixing oxygen tube, the injector body comprising:

a central passageway running between first and second ends of the injector body, a first portion of said central passageway enclosing a swirl baffle;

a second portion of said central passageway including an injector orifice;

a third portion of said central passageway comprising a mixing chamber, the third portion having a diameter that is larger than a diameter of said second portion, the swirl baffle, the injector orifice, and the mixing chamber sharing a common axis; and a gas inlet port extending from a wall of the mixing chamber to the fuel gas tube, the gas port for receiving fuel gas from the fuel gas tube and for directing said fuel gas to said mixing chamber.

10. The gas torch of claim 9, wherein the gas inlet port has a port diameter, and the gas inlet port is spaced a first distance from the transition between the second and third portions of the central passageway, wherein the first distance is equal to or less than two times the port diameter.

11. The gas torch of claim 9, wherein the gas inlet port comprises a plurality of gas inlet ports evenly spaced about a circumference of the injector body.

12. The gas torch of claim 9, wherein the torch head includes a fuel gas port having a first portion in fluid communication with the fuel gas tube, the fuel gas port having a second portion in fluid communication with the gas inlet port of the injector body.

13. The gas torch of claim 9, wherein a transition between the second and third portions of the central passageway comprises a chamfer.

14. A method for mixing gases within a head of a gas torch, the method comprising:

passing a first gas through a swirl baffle, the swirl baffle positioned directly adjacent the head of the gas torch;

passing the first gas from the swirl baffle into an injector orifice; and passing the first gas from the injector orifice into a mixing chamber, the mixing chamber having a diameter larger than a diameter of the injector orifice, the swirl baffle, the injector orifice, and the mixing chamber sharing a common axis;

wherein passing the first gas from the injector orifice into the mixing chamber creates a pressure gradient that pulls a second gas into the mixing chamber through a gas port disposed in a wall of the mixing chamber.

15. The method of claim 14, wherein passing a first gas through the swirl baffle comprises directing preheat oxygen from an oxygen source through a mixing oxygen tube in fluid communication with said swirl baffle.

16. The method of claim 14, wherein the second gas is fuel gas, and the pressure gradient comprises a first pressure in the mixing chamber and a second pressure in the gas port, the first pressure being lower than the second pressure.

17. The method of claim 14, wherein the first gas is oxygen, and the second gas is selected from the list consisting of acetylene, natural gas, propane, propylene qtane.

18. The method of claim 14, comprising mixing the first and second gases in the mixing chamber.

19. The method of claim 14, further comprising combining the mixed first and second gases with a supply of cutting gas in the torch head.

* * * * *